United States Patent
Harada

(10) Patent No.: US 8,085,362 B2
(45) Date of Patent: Dec. 27, 2011

(54) LIQUID CRYSTAL MODULE

(75) Inventor: Suehiro Harada, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 275 days.

(21) Appl. No.: 12/612,740

(22) Filed: Nov. 5, 2009

(65) Prior Publication Data
US 2010/0157192 A1 Jun. 24, 2010

(30) Foreign Application Priority Data
Dec. 24, 2008 (JP) .................. 2008-326947

(51) Int. Cl.
G02F 1/13357 (2006.01)
F21V 19/00 (2006.01)

(52) U.S. Cl. .......... 349/70; 349/58; 362/97.2; 362/216; 362/225

(58) Field of Classification Search .......... 349/58, 349/70; 362/97.1, 97.2, 216, 217.09, 217.15, 362/225, 260, 396
See application file for complete search history.

(56) References Cited

U.S. PATENT DOCUMENTS

| | | | |
|---|---|---|---|
| 2003/0218877 A1 | 11/2003 | Moon | |
| 2005/0162582 A1 | 7/2005 | Kitada et al. | |
| 2007/0047264 A1 | 3/2007 | Joo et al. | |
| 2008/0291355 A1* | 11/2008 | Sudo | 349/58 |
| 2009/0190066 A1* | 7/2009 | Sudo | 349/62 |

FOREIGN PATENT DOCUMENTS

| | | |
|---|---|---|
| JP | 09-063539 A | 3/1997 |
| JP | 2004-342335 A | 12/2004 |
| JP | 2004-342576 A | 12/2004 |

OTHER PUBLICATIONS

EP Search Report of corredsponding EP Application No. 09 17 8585.7 dated Nov. 24, 2010.

* cited by examiner

Primary Examiner — David Nelms
Assistant Examiner — Tai Duong
(74) Attorney, Agent, or Firm — Global IP Counselors

(57) ABSTRACT

A liquid crystal module includes a rear frame, a U-shaped cold cathode tube and a cold cathode tube support member. The U-shaped cold cathode tube has a first straight tube portion, a second straight tube portion and a curved end portion that connects the first and second straight tube portions. The cold cathode tube support member has a mating component and an engaging component. The mating component restricts movements of the first straight tube portion in first and second directions of the rear frame relative to the rear frame. The engaging component restricts a movement of the second straight tube portion in the first direction of the rear frame relative to the rear frame. The engaging component supports the second straight tube portion for movement in the second direction of the rear frame relative to the rear frame.

9 Claims, 4 Drawing Sheets

LIQUID CRYSTAL MODULE

CROSS-REFERENCE TO RELATED APPLICATIONS

This application claims priority to Japanese Patent Application No. 2008-326947, filed on Dec. 24, 2008. The entire disclosure of Japanese Patent Application No. 2008-326947 is hereby incorporated herein by reference.

BACKGROUND OF THE INVENTION

1. Field of the Invention

The present invention generally relates to a liquid crystal module. More specifically, the present invention relates to a liquid crystal module having a U-shaped cold cathode tube.

2. Background Information

With a conventional liquid crystal module, a U-shaped cold cathode tube is used as a light source for a direct backlight. The tolerance (usually ±1 mm) in a bending pitch of the U-shaped cold cathode tube need to be absorbed to prevent the U-shaped cold cathode tube from cracking. Thus, one straight tube part of the U-shaped cold cathode tube is supported by a support of a cold cathode tube support member that is fixed to a bottom plate of a rear frame. Furthermore, a U-shaped curved end of the U-shaped cold cathode tube is supported by a rubber lamp holder that is fixed to the bottom plate of the rear frame, so that the U-shaped cold cathode tube is attached inside the rear frame.

There is also a known backlight-use lighting apparatus in which a flat, curved discharge lamp is disposed inside reflective casing tabs (see Japanese Laid-Open Patent Application Publication No. H9-63539, for example). With the lighting apparatus, a power feed terminal side of the curved discharge lamp is fixed with a lamp holder made of an elastic material. Furthermore, a part of each of parallel straight tube parts of the curved discharge lamp is constricted in diameter to no more than 30% of the original diameter, and the constricted parts are fixed to the casing with latching.

However, when the rubber lamp holder that is separate from the cold cathode tube support member is used to support the U-shaped curved end of the U-shaped cold cathode tube as with a conventional liquid crystal module, the use of the rubber lamp holder increases the number of parts required and the number of assembly steps, which drives up the manufacturing cost.

This problem can be more or less solved by providing additional supports to the cold cathode tube support member, supporting and fixing the two straight tube parts of the U-shaped cold cathode tube with the additional supports, and eliminating the lamp holder. However, if the two straight tube parts of the U-shaped cold cathode tube are supported and fixed with the additional supports of the cold cathode tube support member, then tolerance in the bending pitch of the U-shaped cold cathode tube can no longer be absorbed, and the bent portion of the U-shaped cold cathode tube is subjected to strain and end up cracking. Thus, it is difficult to employ the above solution.

It is also difficult to absorb the tolerance of the bending pitch when the constricted parts formed in the parallel straight tube parts of the curved discharge lamp are fixed to the casing with latching tabs as with the above-mentioned lighting apparatus.

In view of the above, it will be apparent to those skilled in the art from this disclosure that there exists a need for an improved liquid crystal module. This invention addresses this need in the art as well as other needs, which will become apparent to those skilled in the art from this disclosure.

SUMMARY OF THE INVENTION

The present invention was conceived in light of the above-mentioned problems. One object of the present invention is to provide a liquid crystal module in which a U-shaped cold cathode tube is attached to a rear frame so that a tolerance of a bending pitch of the U-shaped cold cathode tube can be absorbed.

In accordance with one aspect of the present invention, a liquid crystal module includes a rear frame, a U-shaped cold cathode tube and a cold cathode tube support member. The U-shaped cold cathode tube is disposed on one side of the rear frame. The U-shaped cold cathode tube has a first straight tube portion, a second straight tube portion and a curved end portion that connects the first and second straight tube portions. The cold cathode tube support member is fixedly coupled to the rear frame and supports the U-shaped cold cathode tube relative to the rear frame. The cold cathode tube support member has a mating component and an engaging component. The mating component mates with the first straight tube portion. The mating component restricts movements of the first straight tube portion in first and second directions of the rear frame relative to the rear frame. The first and second directions of the rear frame are perpendicular to each other and are perpendicular to a center axis of the first straight tube portion. The engaging component engages the second straight tube portion. The engaging component restricts a movement of the second straight tube portion in the first direction of the rear frame relative to the rear frame. The engaging component supports the second straight tube portion for movement in the second direction of the rear frame relative to the rear frame.

With the liquid crystal module of the present invention, it is possible to provide a liquid crystal module in which a U-shaped cold cathode tube is attached to a rear frame so that a tolerance of a bending pitch of the U-shaped cold cathode tube can be absorbed.

These and other objects, features, aspects and advantages of the present invention will become apparent to those skilled in the art from the following detailed descriptions, which, taken in conjunction with the annexed drawings, disclose a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

A preferred embodiment of the present invention will now be explained with reference to the drawings. It will be apparent to those skilled in the art from these disclosures that the following descriptions of the preferred embodiment of the present invention are provided for illustration only and not for the purpose of limiting the invention as defined by the appended claims and their equivalents.

Figure 1:
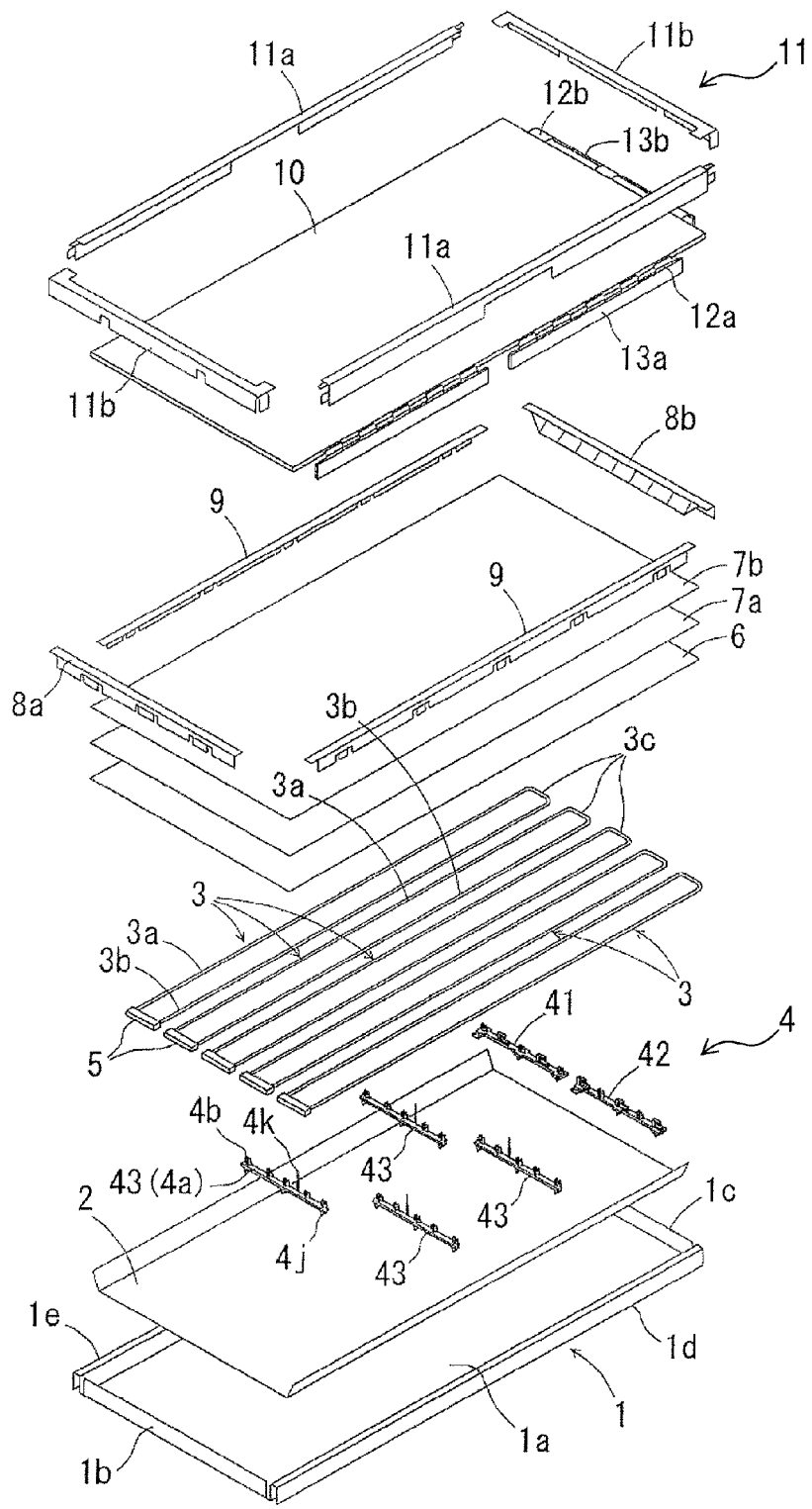
FIG. 1 is an exploded perspective view of a liquid crystal module in accordance with one embodiment of the present invention.
Figure 2:
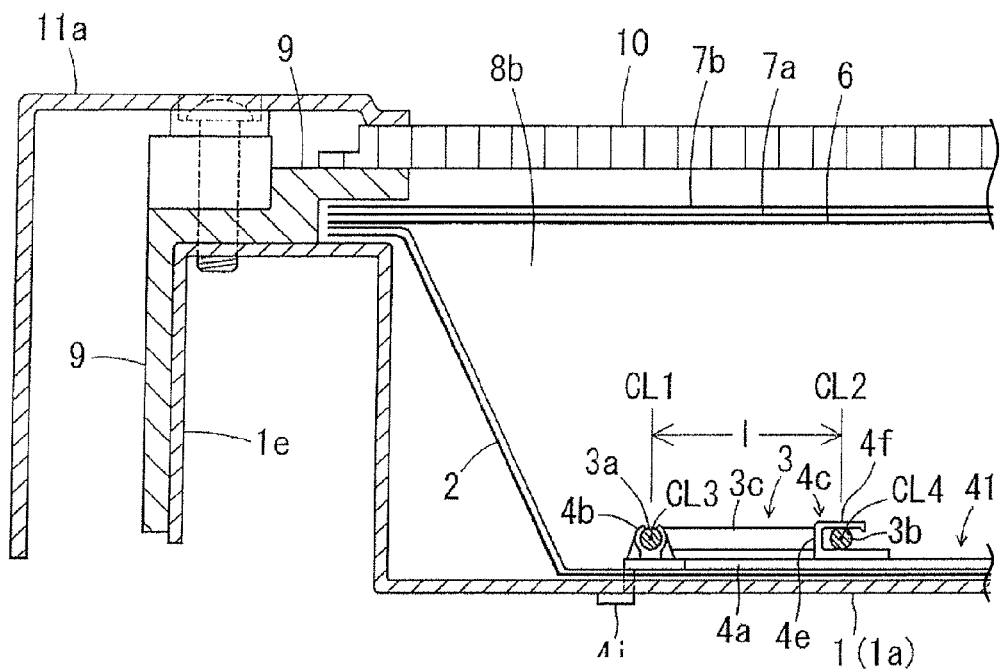
FIG. 2 is a partial cross sectional view of the liquid crystal module taken along II-II line illustrated in FIG. 3.
Figure 3:
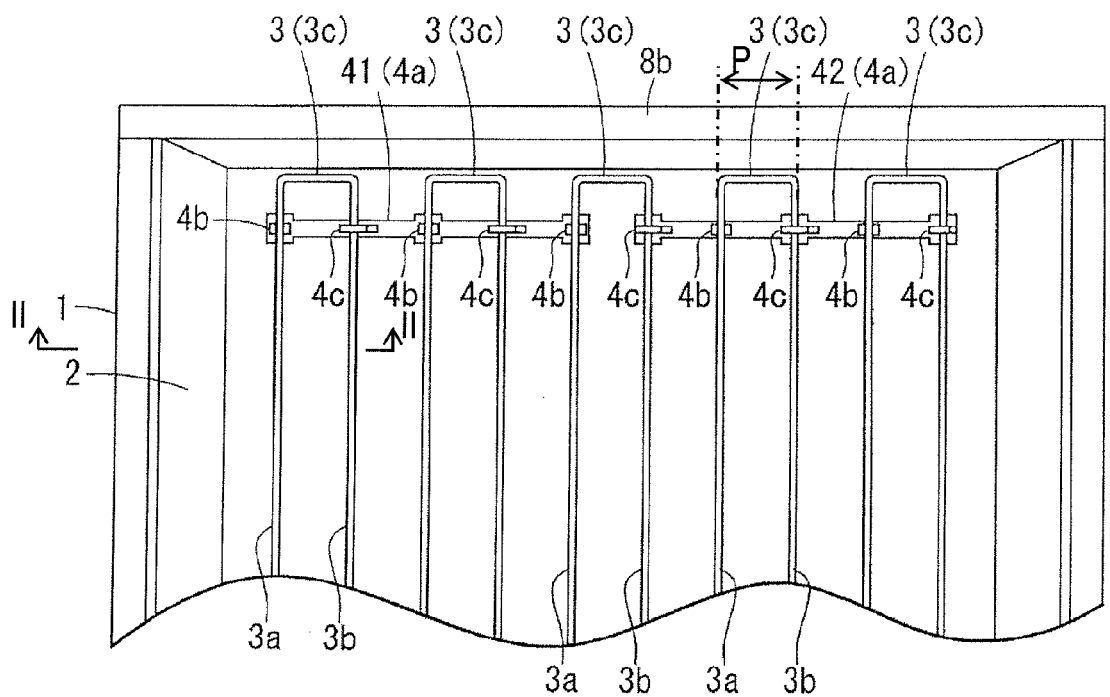
FIG. 3 is a partial elevational view of a rear frame of the liquid crystal module illustrated in FIG. 1.

As shown in FIGS. 1 to 3, a liquid crystal module is a large module that is installed in a large-screen liquid crystal television set, personal computers or other electronic devices. The liquid crystal module basically includes a rear frame 1, a light reflecting sheet 2, a plurality of (five) U-shaped cold cathode tubes 3, a plurality of lamp holders (e.g., cold cathode tube support members) 4, a plurality of lamp sockets 5, a plurality of optical sheets 6, 7a and 7b, a pair of lamp frame 8a and 8b, a pair of panel supports (e.g., cell guides) 9, a liquid crystal panel (e.g., liquid crystal cell) 10, and a bezel 11. The liquid crystal module is a direct backlit type liquid crystal module.

The rear frame 1 is made of sheet metal. The rear frame 1 has a shallow box shape. The light reflecting sheet 2 is provided on an inside of the rear frame 1. The U-shaped cold cathode tubes 3 are parallel to one another. The U-shaped cold cathode tubes 3 are arranged on the light reflecting sheet 2 and supported by the lamp holders 4. The lamp holders 4 are fixedly coupled to the rear frame 1. The lamp holders 4 include three kinds of cold cathode tube support members 41, 42 and 43. The U-shaped cold cathode tubes 3 are supported by the cold cathode tube support members 41, 42, and 43. The cold cathode tube support members 41, 42, and 43 are fixed to a bottom plate 1a of the rear frame 1 from above the light reflecting sheet 2. The attachment structure for the U-shaped cold cathode tubes 3 will be described in detail later.

The lamp sockets 5 are attached to end portions of the U-shaped cold cathode tubes 3 (the end portions located on a power feed terminal side). The lamp sockets 5 are fitted and fixed to socket fitting openings (not shown) formed in the bottom plate 1a of the rear frame 1 along one side plate 1b on one short side of the rear frame 1. The end portions of the U-shaped cold cathode tubes 3 to which the lamp sockets 5 are attached are covered with the lamp frame 8a attached to the side plate 1b of the rear frame 1 in order to eliminate uneven brightness caused by shadows from the lamp sockets 5. Each of the U-shaped cold cathode tubes 3 has a pair of straight tube parts (e.g., first and second straight tube portions) 3a and 3b and a U-shaped curved end (e.g., curved end portion) 3c that connects the straight tube parts 3a and 3b. The straight tube parts 3a and 3b have the same diameter. The U-shaped curved end 3c is located on the opposite side of the end portions of the straight tube parts 3a and 3b. The U-shaped curved ends 3c are exposed from the lamp frame 8b attached to the other side plate 1c on the opposite side of the side plate 1b of the rear frame 1 so that the light emitted from the U-shaped curved ends 3c can be efficiently utilized.

Side plates 1d and 1e on the long sides of the rear frame 1 are each bent in an inverted U shape to create a double-wall side plate. The four peripheral edges of the optical sheets 6, 7a, and 7b are placed on or inserted in sheet insertion grooves (not shown) of the lamp frames 8a and 8b and the upper faces of the double-wall side plates 1d and 1e. The optical sheets 6, 7a and 7b are light diffusing sheets that diffuse the light emitted from the U-shaped cold cathode tubes 3 and shine it uniformly on the liquid crystal panel 10. The upper two optical sheets 7a and 7b are thin light diffusing sheets, but the lower optical sheet 6 is a thicker light diffusing sheet (e.g., light diffusing plate) in the form of an inflexible panel.

The edges along the long sides of the optical sheets 6, 7a, and 7b are held down by the panel supports 9 attached to the double-wall side plates 1d and 1e on the long sides of the rear frame 1. The four peripheral edges of the liquid crystal panel 10 are placed over the panel supports 9 and the lamp frames 8a and 8b, which also serve as panel supports. The bezel 11 includes two long bezels 11a and two short bezels 11b. The four peripheral edges of the liquid crystal panel 10 are held down and fixed by the long bezels 11a that are screwed to the double-wall side plates 1d and 1e of the rear frame 1, and by the short bezels 11b that are screwed to a bezel fixing component (not shown) of the side plates 1b and 1c of the rear frame 1.

A relay board 13a (X-PCB) is electrically connected to one long side of the liquid crystal panel 10 through a COF (chip on film) 12a on which a source driver IC chip has been mounted. A relay board 13b (Y-PCB) is connected to a short side of the liquid crystal panel 10 through a COF 12b on which a gate driver IC chip has been mounted. The relay boards 13a and 13b are fixed to the outer faces of the panel supports 9 and the lamp frame 8b.

With the liquid crystal module, the U-shaped cold cathode tubes 3 emit light. Then, the light is reflected by the light reflecting sheet 2, is diffused by the optical sheets 6, 7a, and 7b, and shines uniformly on the rear face of the liquid crystal panel 10. Therefore, a sharp image can be viewed with no uneven brightness.

The liquid crystal module includes the cold cathode tube support members 41 and 42 that can absorb the tolerance of the bending pitch P of the U-shaped cold cathode tubes 3. The cold cathode tube support member 41 is integrally formed as a one-piece, unitary member. The cold cathode tube support member 42 is integrally formed as a one-piece, unitary member. The cold cathode tube support members 41 and 42 are used to support and fix the portions of the U-shaped cold cathode tubes 3 near the U-shaped curved ends 3c (e.g., near side end portions of the straight tube parts 3a and 3b that are located on a near side of the straight tube parts 3a and 3b relative to the U-shaped curved ends 3c). As a result, the conventional lamp holder can be eliminated, the number of parts and assembly steps can be reduced, manufacturing cost can be lowered, and the work of attaching the U-shaped cold cathode tubes 3 can be easier.

Figure 4A:
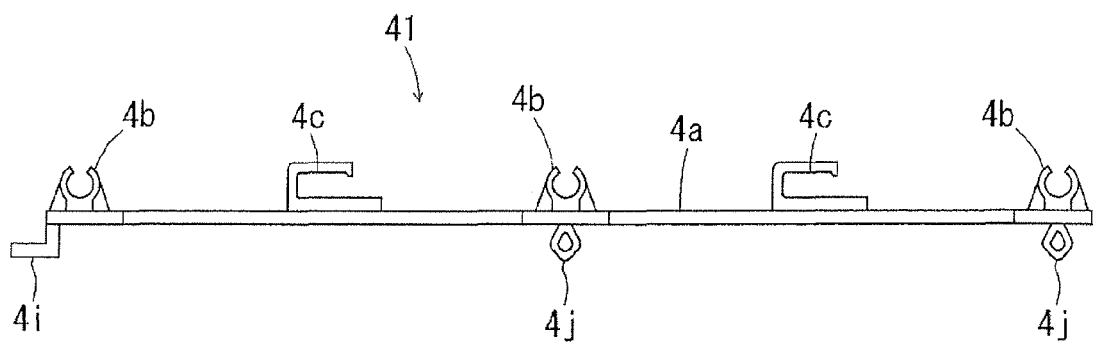
FIG. 4A is a side view of a cold cathode tube support member of the liquid crystal module illustrated in FIG. 1.
Figure 4B:
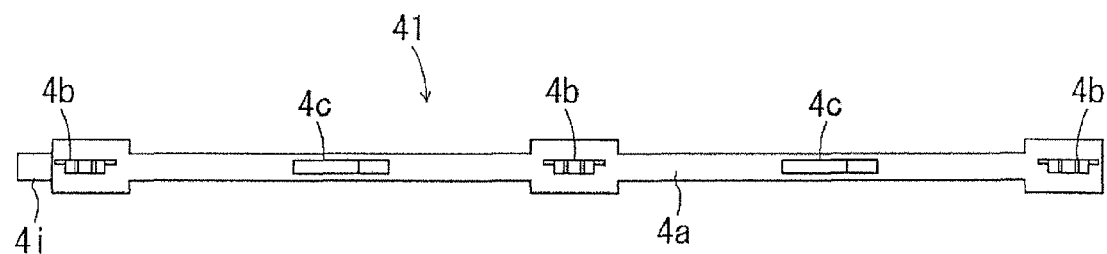
FIG. 4B is a front elevational view of the cold cathode tube support member of the liquid crystal module illustrated in FIG. 1.

Specifically, as shown in FIGS. 2 to 6, the cold cathode tube support member 41 is made of a polycarbonate or other thermoplastic resin. The cold cathode tube support members 41 has a plurality of (a total of five) open circular mating components (e.g., mating components, or open circular portion) 4b and oblong hook-shaped engaging components (e.g., engaging component) 4c formed in an alternating pattern on the upper face of a slender base 4a of the cold cathode tube support member 41. As shown in FIG. 4, there are more of the open circular mating components 4b than the oblong hook-shaped engaging components 4c. Thus, there are open circular mating components 4b at both end portions of the cold cathode tube support member 41.

Figure 5:
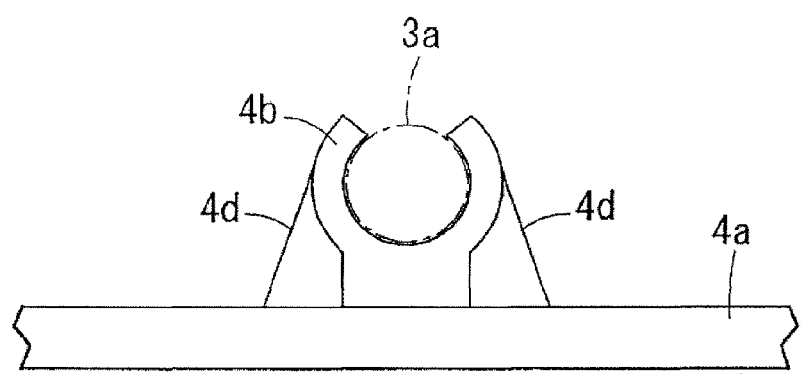
FIG. 5 is a detailed side view of a mating component of the cold cathode tube support member illustrated in FIG. 4A.

As shown in FIGS. 2 and 5, the open circular mating components 4b have an inside diameter that is substantially the same as the diameter of the straight tube parts 3a of the U-shaped cold cathode tubes 3. For example, when the U-shaped cold cathode tubes 3 are used in which the diameter of the straight tube parts 3a is 3 mm, the inside diameter of the open circular mating components 4b is about 3 mm. The upper part is cut away over about one-fourth of the arc. Thus, the open circular mating components 4b open toward a front side of the rear frame relative to the straight tube parts 3a. When one of the straight tube parts 3a of the U-shaped cold cathode tubes 3 is pushed in from the cut-away upper part, the open circular mating component 4b is elastically spread apart, and the straight tube part 3a is mated so that the straight tube part 3a is restricted to move frontward and rearward relative to the bottom plate 1a of the rear frame 1 in the vertical direction of the rear frame 1 (up and down in FIG. 4A), is restricted to move upward and downward relative to the bottom plate 1a of the rear frame 1 in the front-rear direction of the rear frame 1 (left and right in FIG. 4A), and is supported at a specific height by the open circular mating component 4b. Here, the vertical direction and the front-rear direction are perpendicular to each other and are perpendicular to a center axis of the straight tube part 3a. Reinforcing ribs 4d are formed on both sides of each of the open circular mating components 4b. The reinforcing ribs 4d keep the open circular mating components 4b from being bent too far and breaking when the straight tube parts 3a of the U-shaped cold cathode tubes 3 are mated.

Figure 6:
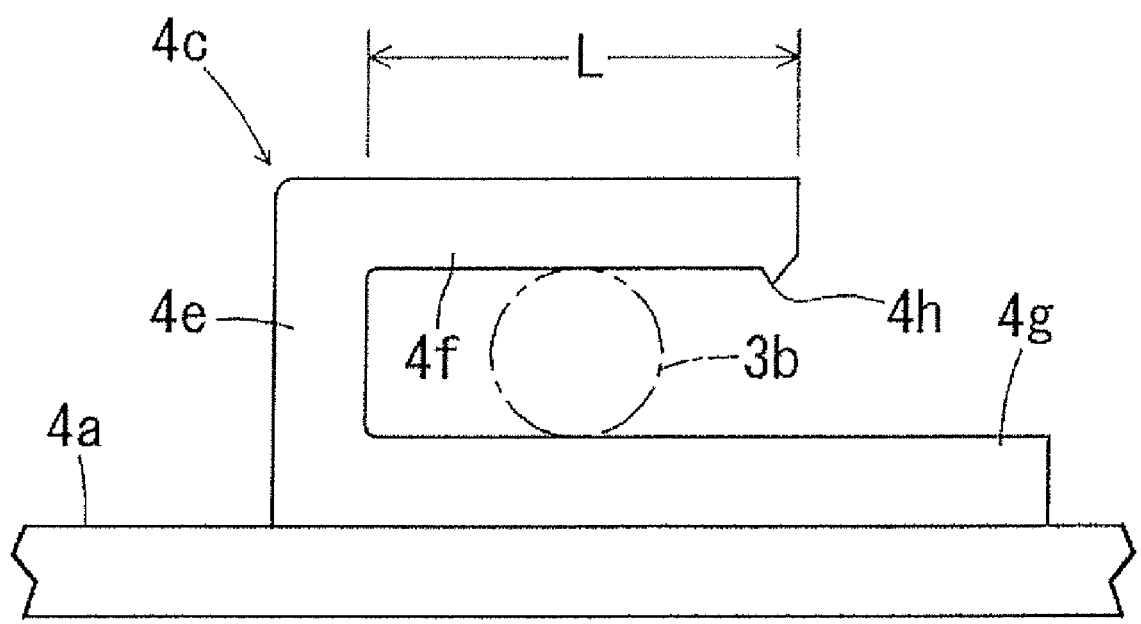
FIG. 6 is a detailed side view of an engaging component of the cold cathode tube support member illustrated in FIG. 4A.

Meanwhile, as shown in FIGS. 2 and 6, each of the oblong hook-shaped engaging components 4c has a riser (e.g., base part) 4e, a horizontal engagement tab (e.g., engagement tab) 4f and a rib 4g. The riser 4e, the horizontal engagement tab 4f and the rib 4g are integrally formed as a one-piece, unitary member. The horizontal engagement tab 4f sticks out to one side and is integrally molded at the upper end of the riser 4e. Specifically, the horizontal engagement tab 4f extends from an end portion of the riser 4e in the vertical direction of the rear frame 1. The riser 4e rises up from the slender base 4a of the cold cathode tube support member 41. The rib 4g supports the straight tube part 3b of the U-shaped cold cathode tube 3 at the same height as the straight tube part 3a. The rib 4g is formed on the upper face of the slender base 4a beneath the horizontal engagement tab 4f. The distance from the upper face of the rib 4g to the lower face of the horizontal engagement tab 4f is substantially the same as the diameter of the straight tube part 3b. The length of the rib 4g is larger than that of the horizontal engagement tab 4f. The length L of the horizontal engagement tab 4f of the oblong hook-shaped engaging component 4c is set to be greater than the sum of adding the diameter of the straight tube part 3b to two times the absolute value of the tolerance of the bending pitch P of the U-shaped cold cathode tube 3. For example, when the diameter of the straight tube parts 3a and 3b is 3 mm and the maximum tolerance of the bending pitch P is ±1 mm, the length L of the horizontal engagement tabs 4f is set to be greater than the 5 mm that is the sum of adding the 3 mm diameter of the straight tube parts 3a and 3b to the 2 mm size that is two times the absolute value of the maximum tolerance. More specifically, it is set to about 6 mm to be on the safe side. When the straight tube parts 3b of the U-shaped cold cathode tubes 3 are inserted from the open portion on one side of the oblong hook-shaped engaging components 4c, the straight tube parts 3b are engaged and supported so that the straight tube parts 3b is allowed to move upward and downward relative to the bottom plate 1a of the rear frame 1 in the vertical direction of the rear frame 1 (left and right in FIG. 4A), but is restricted to move frontward and rearward relative to the bottom plate 1a of the rear frame 1 in the front-rear direction of the rear frame 1 (up and down in FIG. 4A). Also, a small prong (e.g., protrusion part) 4h is formed on the lower face at the distal end of each of the horizontal engagement tabs 4f. The prong 4h protrudes from the distal end of the horizontal engagement tab 4f toward the rear frame 1. The prongs 4h prevent the straight tube parts 3b of the U-shaped cold cathode tubes 3 from coming loose from the oblong hook-shaped engaging components 4c.

As shown in FIG. 2, the open circular mating components 4b and the oblong hook-shaped engaging components 4c are alternately provided to the cold cathode tube support member 41 at spaced apart locations. Specifically, the interval I between the center line CL1 of one of the open circular mating components 4b (e.g., the vertical center of the open circular mating components 4b) and the center line CL2 of one of the oblong hook-shaped engaging component 4c (e.g., the vertical center of the oblong hook-shaped engaging component 4c) is equal to the interval between the center lines CL3 and CL4 of the two straight tube parts 3a and 3b of the U-shaped cold cathode tube 3. Therefore, when the straight tube part 3a is mated with the open circular mating component 4b, and the other straight tube part 3b is engaged with the oblong hook-shaped engaging component 4c, thereby supporting the U-shaped cold cathode tube 3, if the bending pitch P of the U-shaped cold cathode tube 3 is as specified, then the straight tube part 3b will be positioned in the vertical center of the oblong hook-shaped engaging component 4c.

As shown in FIG. 4, each of the cold cathode tube support members 41 further has an L-shaped piece 4i and a pair of hollow protrusions 4j. The L-shaped piece 4i is formed on the lower face at one end of the slender base 4a of the cold cathode tube support member 41. The hollow protrusions 4j are formed on the lower face at the other end and in the middle of the slender base 4a. The L-shaped piece 4i is hooked in an attachment hole of the bottom plate 1a of the rear frame 1 through an opening in the light reflecting sheet 2. The hollow protrusions 4j are plugged into attachment holes in the bottom plate 1a of the rear frame 1 through openings in the light reflecting sheet 2. As a result, as shown in FIG. 3, the cold cathode tube support member 41 is attached to one side (the right upper side) of the bottom plate 1a of the rear frame 1 along the lamp frame 8b.

The other cold cathode tube support member 42 is similar to the cold cathode tube support member 41 in that the cold cathode tube support member 42 has a plurality of (a total of five) open circular mating components 4b and oblong hook-shaped engaging components 4c formed in an alternating pattern. As shown in FIG. 3, there are more of the oblong hook-shaped engaging components 4c than the open circular mating components 4b. Thus, there are oblong hook-shaped engaging components 4c at both end portions of the cold cathode tube support member 42. The rest of the configuration of the cold cathode tube support member 42 is the same as that of the cold cathode tube support member 41, so redundant description will be omitted.

As shown in FIG. 3, the cold cathode tube support member 42 is aligned in a row with the cold cathode tube support member 41 along the lamp frame 8b. Specifically, the cold cathode tube support member 41 is disposed on an upper side of the cold cathode tube support member 42 in the vertical direction of the rear frame 1. The interval between the support members 41 and 42 is adjusted and these members are attached to the bottom plate 1a of the rear frame 1 so that the interval between the center lines of the open circular mating component 4b at the lower end (right end in FIG. 3) of the cold cathode tube support member 41 and the oblong hook-shaped engaging component 4c at the upper end (left end in FIG. 3) of the cold cathode tube support member 42 is equal to the interval between the center lines of the two straight tube parts 3a and 3b of the U-shaped cold cathode tube 3 that is disposed in the middle of the U-shaped cold cathode tubes 3. Furthermore, the support members 41 and 42 are attached to the bottom plate 1a of the rear frame 1 so that the horizontal engagement tabs 4f of the oblong hook-shaped engaging components 4c extends downward relative to the risers 4e.

As shown in FIG. 1, the cold cathode tube support members 43 support portions (e.g., far side end portions of the straight tube parts 3a and 3b that are located on a far side of the straight tube parts 3a and 3b relative to the U-shaped curved ends 3c) of the straight tube parts 3a and 3b of the U-shaped cold cathode tubes 3 that are farther away from the U-shaped curved ends 3c. Each of the cold cathode tube support members 43 has a plurality of (five) open circular mating components 4b and a support pin 4k that are formed on a slender base. The support pins 4k support the optical sheets 6, 7a, and 7b and the liquid crystal panel 10 so that they will not sag. The cold cathode tube support members 43 also have the hollow protrusions 4j on the rear face of the slender bases. The hollow protrusions 4j are plugged into attachment holes in the bottom plate 1a of the rear frame 1 through openings in the light reflecting sheet 2 to attach the cold cathode tube support members 43.

As shown in FIGS. 2 and 3, the attachment of the U-shaped cold cathode tubes 3 (attachment of the portions near the U-shaped curved ends 3c) is accomplished as follows. First, the portions of the straight tube parts 3b of the U-shaped cold cathode tubes 3 near the U-shaped curved ends 3c are inserted through the open portions on one side of the oblong hook-shaped engaging components 4c of the cold cathode tube support members 41 and 42 to engage the portions so that there is no movement up or down (e.g., forward or rearward relative to the bottom plate 1a of the rear frame 1). Then, the portions of the straight tube parts 3a near the U-shaped curved ends 3c mate with the open circular mating components 4b from above so that there is no movement up, down, left, or right (e.g., forward, rearward, upward or downward relative to the bottom plate 1a of the rear frame 1). When the portions of the U-shaped cold cathode tubes 3 near the U-shaped curved ends 3c have thus been attached, the straight tube parts 3a are positioned in the front-rear direction (e.g., up and down direction) and in the vertical direction (e.g., left and right direction) by the open circular mating components 4b. On the other hand, the straight tube parts 3b are only positioned in the up and down direction by the oblong hook-shaped engaging components 4c, and are not positioned or restricted in the left and right direction. Therefore, the straight tube parts 3b of the U-shaped cold cathode tubes 3 are engaged in the oblong hook-shaped engaging components 4c of the lamp holders 4 with their position offset to either the left or right by the amount of variance in the bending pitch P. Thus, tolerance of the bending pitch P is absorbed, and the bent portions (e.g., U-shaped curved ends 3c) of the U-shaped cold cathode tubes 3 are not subjected to strain. Accordingly, there is no cracking of the U-shaped cold cathode tubes 3.

Furthermore, since the straight tube parts 3a of the U-shaped cold cathode tubes 3 are positioned up, down, left, and right by the open circular mating components 4b of the lamp holders 4, and the straight tube parts 3b of the U-shaped cold cathode tubes 3 are positioned up and down by the oblong hook-shaped engaging components 4c of the lamp holders 4, the U-shaped cold cathode tubes 3 cannot rotate with the straight tube parts 3a as the rotational center. Thus, even though there is no conventional lamp holder, the U-shaped cold cathode tubes 3 are fixed to the rear frame 1 in a horizontal state. Therefore, the conventional lamp holder can be eliminated. Accordingly, the liquid crystal module entails fewer parts and assembly steps because of the elimination of the lamp holder, which means that the manufacturing cost can be lowered.

The effect of preventing the cracking of the U-shaped cold cathode tubes 3 is particularly pronounced when the portions of both straight tube parts 3a and 3b of the U-shaped cold cathode tubes 3 near the U-shaped curved ends 3c are supported by the cold cathode tube support members 41 and 42. Specifically, when the portions of both straight tube parts 3a and 3b of the U-shaped cold cathode tubes 3 far away from the U-shaped curved ends 3c are supported by a support member, even though the tolerance of the bending pitch P is not absorbed, the bent portions of the U-shaped cold cathode tubes 3 will be subject to little strain. Thus, there is almost no danger that the U-shaped cold cathode tubes 3 will crack. However, when the portions of both straight tube parts 3a and 3b of the U-shaped cold cathode tubes 3 near the U-shaped curved ends 3c are supported, if the tolerance of the bending pitch P cannot be absorbed, then the bent portions of the U-shaped cold cathode tubes 3 will be subject to a great deal of strain, and the U-shaped cold cathode tubes 3 will be susceptible to cracking. Thus, using the cold cathode tube support members 41 and 42 capable of absorbing the tolerance of the bending pitch P to support the portions of the straight tube parts 3a and 3b of the U-shaped cold cathode tubes 3 near the U-shaped curved ends 3c as discussed above is extremely effective in terms of preventing cracking of the U-shaped cold cathode tubes 3.

Also, the open circular mating components 4b of the cold cathode tube support members 41 and 42 are cut open at the top, and the oblong hook-shaped engaging components 4c have the horizontal engagement tabs 4f that sticks out to one side from the upper ends of the risers 4e. The straight tube parts 3b of the U-shaped cold cathode tubes 3 are inserted into the oblong hook-shaped engaging components 4c from the open portion on one side of the oblong hook-shaped engaging component 4c and engaged with the horizontal engagement tabs 4f, respectively, so that there is no up and down movement. The straight tube parts 3a of the U-shaped cold cathode tubes 3 are fitted into the open circular mating components 4b from the cut-open tops of the open circular mating components 4b, respectively, so that there is no up, down, left, or right movement. This means that the U-shaped cold cathode tubes 3 can be supported and fixed extremely simply, which makes assembly work easier.

Furthermore, the open circular mating components 4b and the oblong hook-shaped engaging components 4c are provided to the cold cathode tube support members 41 and 42 at spaced apart locations. The interval between the center lines of the adjacent pairs of the open circular mating components 4b and the oblong hook-shaped engaging components 4c is equal to the center line intervals of the straight tube parts 3a and 3b of the U-shaped cold cathode tubes 3. Furthermore, the length of each of the horizontal engagement tabs 4f of the oblong hook-shaped engaging components 4c is greater than the sum of adding the diameter of the straight tube parts 3b of the U-shaped cold cathode tubes 3 to two times the absolute value of the tolerance of the bending pitch P of the U-shaped cold cathode tubes 3. Thus, no matter how much variance there is the bending pitch P within the range of tolerance of the U-shaped cold cathode tubes 3, this variance in bending pitch P can be effectively absorbed and the U-shaped cold cathode tubes 3 can be supported and fixed without cracking.

The attachment of the portions of the U-shaped cathode tubes 3 farther away from the U-shaped curved ends 3c is accomplished by mating both straight tube parts 3a and 3b of the U-shaped cold cathode tubes 3 with the open circular mating components 4b of the cold cathode tube support members 43. The tolerance of the bending pitch P of the U-shaped cold cathode tubes 3 is not absorbed with the cold cathode tube support members 43. However, when the portions of the U-shaped cold cathode tubes 3 farther away from the U-shaped curved ends 3c are supported and fixed in this way, even though the tolerance of the bending pitch P is not absorbed, little strain is produced at the bent portions of the U-shaped cold cathode tubes 3. Thus, there is basically no worry that the U-shaped cold cathode tubes 3 will crack.

The cold cathode tube support members 41 and 42 can be used instead of the cold cathode tube support members 43 to support and fix the portions of the U-shaped cold cathode tubes 3 farther away from the U-shaped curved ends 3c.

With the liquid crystal module, the lamp holder is eliminated, and the U-shaped cold cathode tubes 3 can be attached to the rear frame 1 with just cold cathode tube support members 41, 42 and 43 and with the tolerance of the bending pitch P absorbed. Accordingly, fewer parts and assembly steps are required, which affords lower costs.

With the liquid crystal module, the cold cathode tube support members 41 and 42 are separately formed as separate members. However, the cold cathode tube support members 41 and 42 can be integrally formed as a one-piece, unitary member. However, when the cold cathode tube support members 41 and 42 are separately formed, it is easy to handle the cold cathode tube support members 41 and 42. Furthermore, with the liquid crystal module, each of the cold cathode tube support members 41 and 42 has a plurality of open circular mating components 4b and the oblong hook-shaped engaging components 4c. However, the cold cathode tube support members can be formed such that each of the cold cathode tube support members has only one open circular mating component 4b and only one oblong hook-shaped engaging component 4c. In this case, five cold cathode tube support members are provided for five U-shaped cold cathode tubes 3. Moreover, with the liquid crystal module, the support members 41 and 42 are attached to the bottom plate 1a of the rear frame 1 so that the horizontal engagement tabs 4f of the oblong hook-shaped engaging components 4c extends downward relative to the risers 4e. However, the support members 41 and 42 can be attached to the bottom plate 1a of the rear frame 1 so that the horizontal engagement tabs 4f of the oblong hook-shaped engaging components 4c extends upward relative to the risers 4e.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position.

While a preferred embodiment has been chosen to illustrate the present invention, it will be apparent to those skilled in the art from these disclosures that various changes and modifications can be made herein without departing from the scope of the invention as defined in the appended claims. Furthermore, the foregoing descriptions of the preferred embodiment according to the present invention are provided for illustration only, and not for the purpose of limiting the invention as defined by the appended claims and their equivalents.

What is claimed is:

1. A liquid crystal module comprising,
a rear frame;
a U-shaped cold cathode tube disposed on one side of the rear frame, the U-shaped cold cathode tube having a first straight tube portion, a second straight tube portion and a curved end portion that connects the first and second straight tube portions; and
a cold cathode tube support member fixedly coupled to the rear frame and supporting the U-shaped cold cathode tube relative to the rear frame, the cold cathode tube support member including
a mating component that mates with the first straight tube portion, the mating component restricting movements of the first straight tube portion in first and second directions of the rear frame relative to the rear frame, the first and second directions of the rear frame being perpendicular to each other and being perpendicular to a center axis of the first straight tube portion, and
an engaging component that engages the second straight tube portion, the engaging component restricting a movement of the second straight tube portion in the first direction of the rear frame relative to the rear frame, and the engaging component supporting the second straight tube portion for movement in the second direction of the rear frame relative to the rear frame.

2. The liquid crystal module according to claim 1, wherein the mating component restricts the movement of the first straight tube portion in a front-rear direction of the rear frame relative to the rear frame, which corresponds to the first direction, and restricts the movement of the first straight tube portion in a vertical direction of the rear frame relative to the rear frame, which corresponds to the second direction, and
the engaging component restricts the movement of the second straight tube portion in the front-rear direction of the rear frame relative to the rear frame, and allows the movement of the second straight tube portion in the vertical direction of the rear frame relative to the rear frame.

3. The liquid crystal module according to claim 1, wherein the cold cathode tube support member supports the U-shaped cold cathode tube at near side end portions of the first and second straight tube portions, respectively, the near side end portions of the first and second straight tube portions being located on a near side of the first and second straight tube portions relative to the curved end portion.

4. The liquid crystal module according to claim 1, wherein the mating component of the cold cathode tube support member has an open circular portion that opens toward a front side of the rear frame relative to the first straight tube portion, and
the engaging component of the cold cathode tube support member has a base part and an engagement tab that extends from an end portion of the base part in the second direction of the rear frame.

5. The liquid crystal module according to claim 4, wherein the mating component and the engaging component are formed at spaced apart locations such that a distance between a vertical center of the open circular portion of the mating component and a vertical center of the engagement tab of the engaging component in a vertical direction of the rear frame is equal to a distance between center axes of the first and second straight tube portions of the U-shaped cold cathode tube, and a length of the engagement tab of the engaging component in the vertical direction of the rear frame is greater than a sum of a diameter of one of the first and second straight tube portions of the U-shaped cold cathode tube and two times an absolute value of a tolerance of a bending pitch of the U-shaped cold cathode tube.

6. The liquid crystal module according to claim 4, wherein the engaging component of the cold cathode tube support member further has a protrusion part that protrudes from a distal end of the engagement tab toward the rear frame.

7. The liquid crystal module according to claim 3, wherein the mating component of the cold cathode tube support member has an open circular portion that opens toward a front side of the rear frame relative to the first straight tube portion, and the engaging component of the cold cathode tube support member has a base part and an engagement tab that extends from an end portion of the base part in the second direction of the rear frame.

8. The liquid crystal module according to claim 7, wherein the mating component and the engaging component are formed at spaced apart locations such that a distance between a vertical center of the open circular portion of the mating component and a vertical center of the engagement tab of the engaging component in a vertical direction of the rear frame is equal to a distance between center axes of the first and second straight tube portions of the U-shaped cold cathode tube, and a length of the engagement tab of the engaging component in the vertical direction of the rear frame is greater than a sum of a diameter of one of the first and second straight tube portions of the U-shaped cold cathode tube and two times an absolute value of a tolerance of a bending pitch of the U-shaped cold cathode tube.

9. The liquid crystal module according to claim 7, wherein the engaging component of the cold cathode tube support member further has a protrusion part that protrudes from a distal end of the engagement tab toward the rear frame.

* * * * *